US012203493B2

(12) United States Patent
Price et al.

(10) Patent No.: US 12,203,493 B2
(45) Date of Patent: Jan. 21, 2025

(54) FLOW RESTRICTOR FOR FLUID FLOW DEVICE

(71) Applicant: HORIBA STEC, Co., Ltd., Kyoto (JP)

(72) Inventors: Andrew Wayne Price, Henderson, NV (US); Era Benjamin Hartman, Cape Girardeau, MO (US); Esteban Daniel Gonzalez, Reno, NV (US); William Wylie White, Sparks, NV (US); Virginia Ann Miller, Reno, NV (US)

(73) Assignee: HORIBA STEC, Co., Ltd., Kyoto (JP)

( * ) Notice: Subject to any disclaimer, the term of this patent is extended or adjusted under 35 U.S.C. 154(b) by 328 days.

(21) Appl. No.: 17/647,591

(22) Filed: Jan. 10, 2022

(65) Prior Publication Data
US 2023/0220857 A1 Jul. 13, 2023

(51) Int. Cl.
| F15D 1/02 | (2006.01) |
| B32B 3/26 | (2006.01) |
| B32B 3/30 | (2006.01) |
| B32B 15/01 | (2006.01) |

(52) U.S. Cl.
CPC .............. *F15D 1/025* (2013.01); *B32B 3/266* (2013.01); *B32B 3/30* (2013.01); *B32B 15/01* (2013.01)

(58) Field of Classification Search
CPC .......... F15D 1/025; B32B 3/266; B32B 3/30; B32B 15/01
USPC ........................................................ 138/42
See application file for complete search history.

(56) References Cited

U.S. PATENT DOCUMENTS

| 3,434,500 A | * | 3/1969 | Burrows ............ G05D 16/0619 138/42 |
| 3,851,526 A | * | 12/1974 | Drexel ...................... G01F 5/00 73/202 |
| 3,856,049 A | * | 12/1974 | Scull ................ F16L 55/02781 138/42 |
| 4,000,878 A | * | 1/1977 | Vick ....................... F16K 47/08 137/625.3 |
| 4,018,245 A | * | 4/1977 | Baumann ................ F16K 47/08 137/625.3 |
| 4,079,754 A | * | 3/1978 | Porter ....................... F15D 1/02 138/42 |

(Continued)

FOREIGN PATENT DOCUMENTS

| JP | 02180274 A | 7/1990 |
| JP | 09088907 A | 3/1997 |
| WO | 2021026216 A1 | 2/2021 |

OTHER PUBLICATIONS

ISA Japan Patent Office, International Search Report Issued in Application No. PCT/JP2022/045356, Feb. 14, 2023, WIPO, 3 pages.

(Continued)

*Primary Examiner* — David R Deal
(74) *Attorney, Agent, or Firm* — Alleman Hall & Tuttle LLP

(57) ABSTRACT

A flow restrictor is provided, comprising a first sheet including a flow passage, and a second sheet stacked on the first sheet. A hole is provided in a center of the second sheet. The flow passage includes a groove cut into a surface of the first sheet that communicates with an expansion zone at a peripheral area of the first sheet. A peripheral edge of the second sheet contacts the first sheet in the expansion zone between an inner diameter and an outer diameter of the expansion zone.

20 Claims, 14 Drawing Sheets

(56) References Cited

U.S. PATENT DOCUMENTS

| | | | | |
|---|---|---|---|---|
| 4,221,037 | A | * | 9/1980 | Seger ............... F16K 47/08 138/42 |
| 5,769,122 | A | * | 6/1998 | Baumann ........ F16L 55/02718 137/625.33 |
| RE36,984 | E | * | 12/2000 | Steinke ............. F16K 47/08 137/625.33 |
| 2006/0005883 | A1 | * | 1/2006 | Mudd ............... G05D 7/0186 137/487.5 |
| 2008/0041481 | A1 | * | 2/2008 | Mudd ................... G01F 1/40 138/42 |
| 2020/0080576 | A1 | | 3/2020 | Whynall |
| 2021/0041279 | A1 | * | 2/2021 | Penley ................ G01F 5/00 |

OTHER PUBLICATIONS

ISA Japan Patent Office, Written Opinion Issued in Application No. PCT/JP2022/045356, Feb. 14, 2023, WIPO, 5 pages.

* cited by examiner

FLOW RESTRICTOR FOR FLUID FLOW DEVICE

BACKGROUND

A flow restrictor is a device to restrict the flow of a fluid, i.e., a gas or a liquid. The certainty of the performance of the flow restrictor to restrict the flow of the fluid is important for various applications, including gas delivery systems. For example, semiconductor manufacturing demands a high certainty that a predetermined flow rate of one gas, or flow rate ratio between two gases, can be achieved by a flow restrictor in a mass flow controller of the gas delivery systems used for the semiconductor manufacturing. Further, restrictors in flow meters can help achieve a high certainty in the accuracy of the flow rate indicated by the flow meter when measuring gas flow rates demanding high precision in semiconductor manufacturing. Therefore, decreasing the uncertainty in the performance of the flow restrictors of fluid flow devices such as mass flow controllers and flow meters is desirable from the standpoint of increasing the quality of fluid delivery in various industrial applications; however, technical challenges have thus far stood as barriers to advancements in restrictor design.

SUMMARY

To address the issues discussed above, a flow restrictor is provided. According to one aspect of the present disclosure, the flow restrictor comprises a first sheet including a flow passage; and a second sheet stacked on the first sheet. A hole is provided in a center of the second sheet. The flow passage includes a groove cut into a surface of the first sheet that communicates with an expansion zone at a peripheral area of the first sheet. A peripheral edge of the second sheet contacts the first sheet in the expansion zone between an inner diameter and an outer diameter of the expansion zone.

According to another aspect of the present disclosure, the flow restrictor comprises a first sheet comprising a flow passage; and a second sheet stacked on the first sheet. A hole is provided in a center of the second sheet, and the flow passage is a serpentine groove cut through a thickness of the first sheet and forming a serpentine shape along a surface of the first sheet as viewed from above.

According to yet another aspect of the present disclosure, the flow restrictor comprises a first sheet comprising a flow passage; and a second sheet stacked on the first sheet. A hole is provided in a center of the second sheet, the second sheet includes a slit penetrating through an entire thickness of the second sheet, and the first sheet and the second sheet are stacked and aligned to form a continuous flow path through the slit of the second sheet and the flow passage of the first sheet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
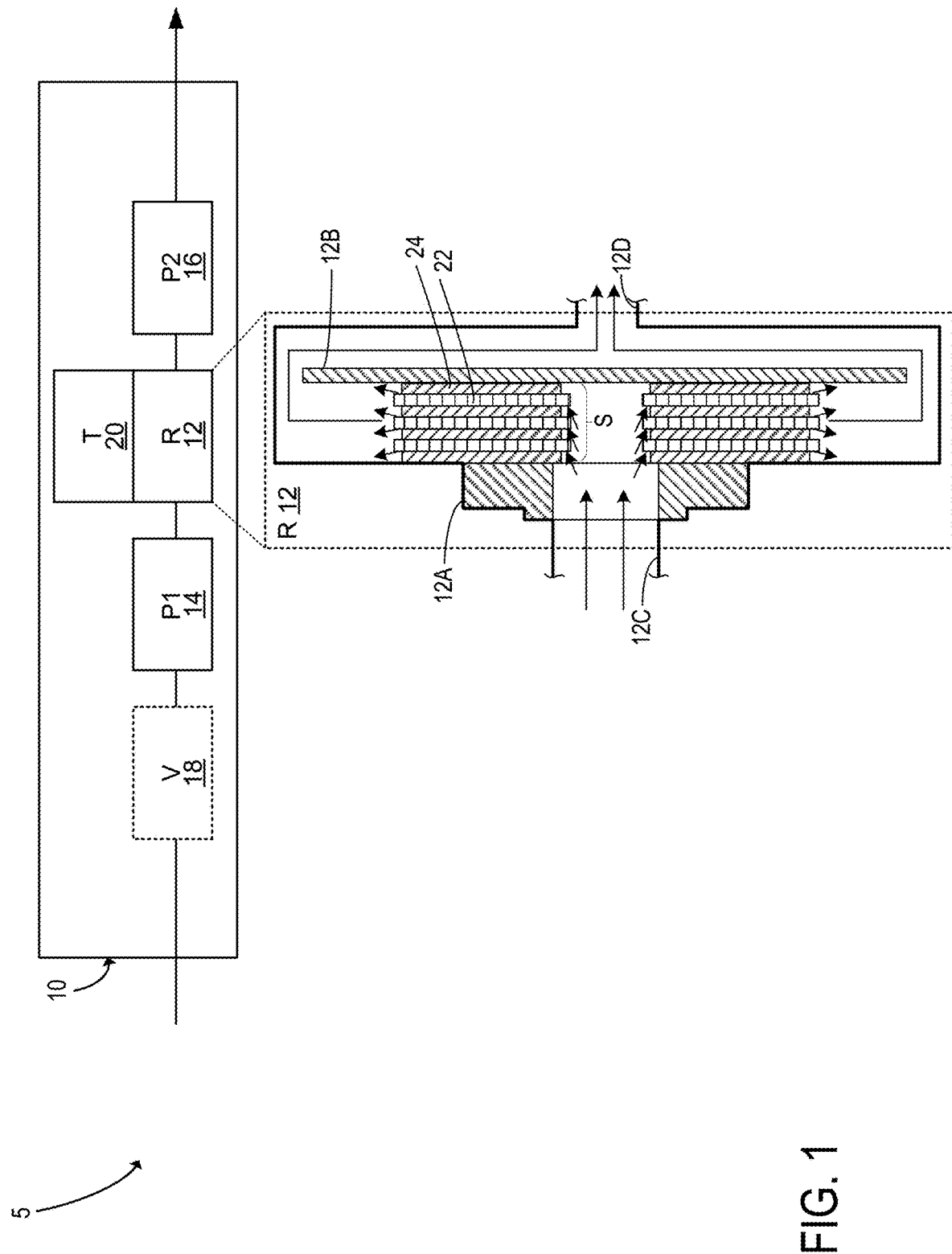
FIG. 1 shows a schematic view of a fluid flow device with a flow restrictor according to one example of the present disclosure.

FIG. 1 shows a schematic view of a fluid flow device 5, which may be in the form of a mass flow controller 10 according to one exemplary embodiment of the present disclosure. The mass flow controller 10 comprises a flow restrictor 12, an upstream pressure sensor 14, a downstream pressure sensor 16, a control valve 18, and a temperature sensor 20. It will be appreciated that in other examples, one or more of the above components can be omitted. For example, either of the pressure sensors 14, 16 may be omitted in some configurations. In another configuration, the control valve 18 may be positioned downstream of the flow restrictor 12. In yet other configurations, the fluid flow device 5 may be configured as a mass flow meter, and thus may not include a control valve 18. Additionally, it will be noted that there can be other components in the mass flow controller 10 that are not depicted in FIG. 1. For example, isolation valves (e.g., shut off valves) may be provided in the flow path on either side of the assembly of FIG. 1 to isolate the fluid flow device 5, and/or a purge line valve may be outfitted downstream of the restrictor to allow purge gas to flow through the fluid flow device 5 to a purge line.

As shown in FIG. 1, flow restrictor 12 typically includes a collar 12A and backing plate 12B which sandwich and secure a stack S of sheets 21. Although seven sheets 21 are depicted in FIG. 1, it will be appreciated that a different number of sheets may be provided, as discussed below. The sheets 21 include first sheets 22 and second sheets 24 which alternate throughout the stack S. An end-to-end restrictor flow path through the restrictor is depicted by the fluid flow arrows, and extends from a restrictor inlet 12C on an upstream side to a restrictor outlet 12D on a downstream side of the restrictor 12, although the restrictor can be used for flow in either direction (i.e., bidirectional flow). Within the end-to-end restrictor flow path, first sheets 22 each define an in-sheet flow path 26a that allows fluid to flow from an interior region of the restrictor, radially outward to a peripheral end of the first sheet 22. Once the fluid flows out of the flow paths 26a in first sheets 22 in stack S, it is guided along the end-to-end flow path to the restrictor outlet 12D by external structures, as shown.

Figure 2A:
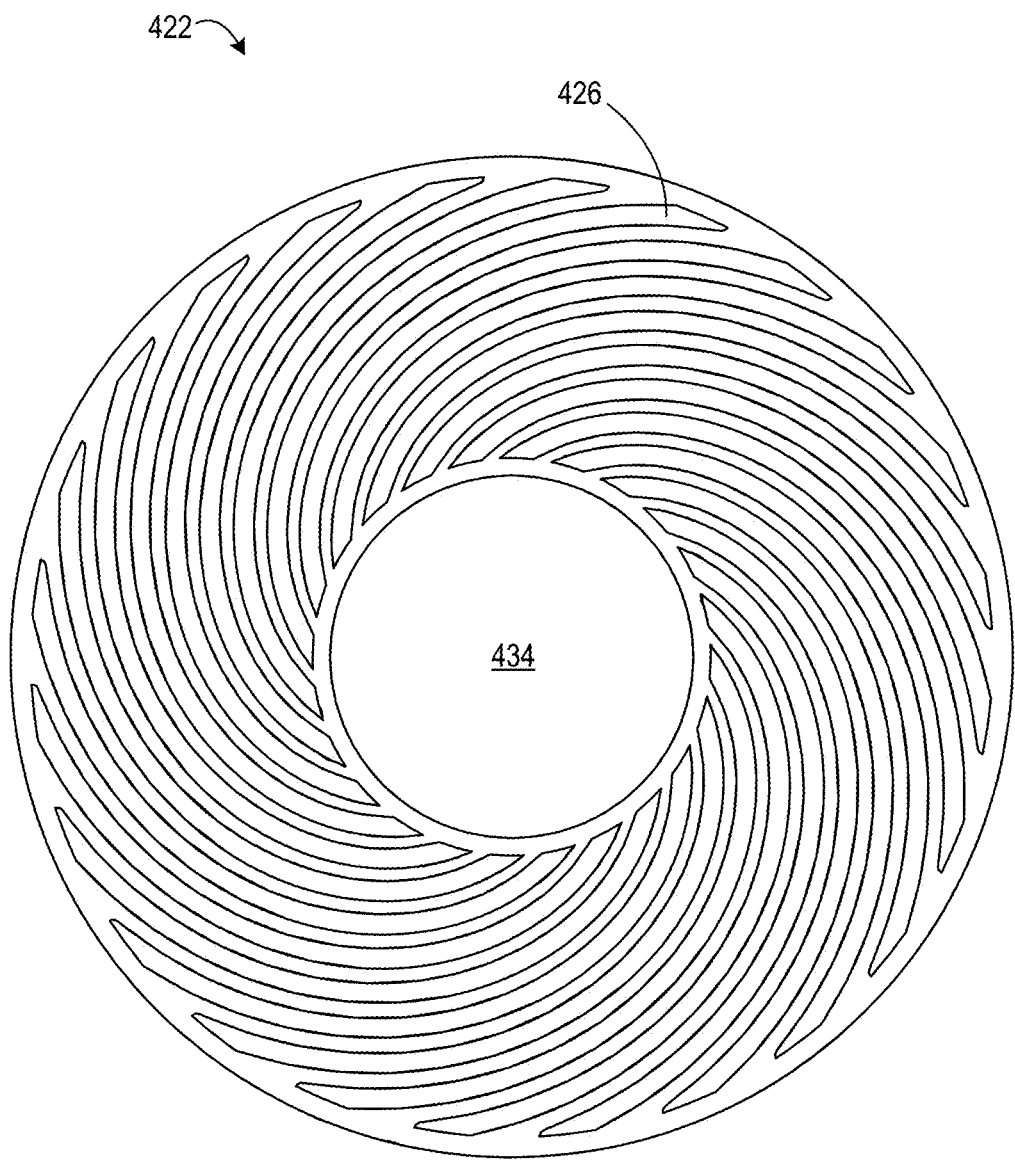
FIG. 2A shows a schematic, planar view of a conventional disk of a conventional flow restrictor.

FIG. 2A shows a schematic, planar view of a conventional disk 422 of a flow restrictor comprising a flow passage 426 that spirals from a hole 434 of the disk 422. It will be appreciated that the flow passage 426 maintains its spiral shape in the peripheral areas of the disk 422. A problem with the restrictor design depicted in FIG. 2A has been discovered, namely that uncertainty in the flow rates measured through this restrictor is too high under certain flow conditions. It is thought that geometrical uncertainties at the end of the flow passages due to manufacturing tolerances might contribute to this flow rate uncertainty.

Figure 2B:
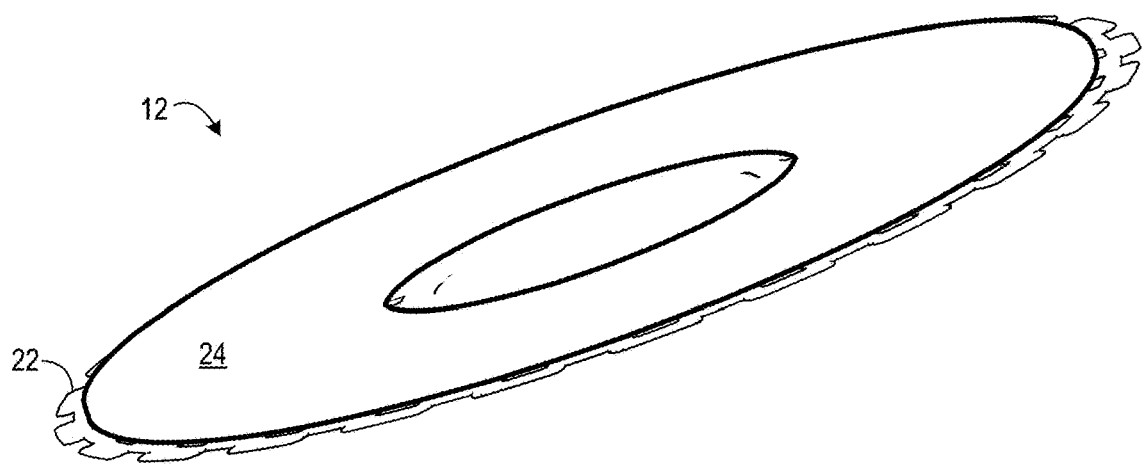
FIG. 2B shows a schematic, perspective view of a flow restrictor according to one example of the gas delivery system of FIG. 1.
Figure 2C:
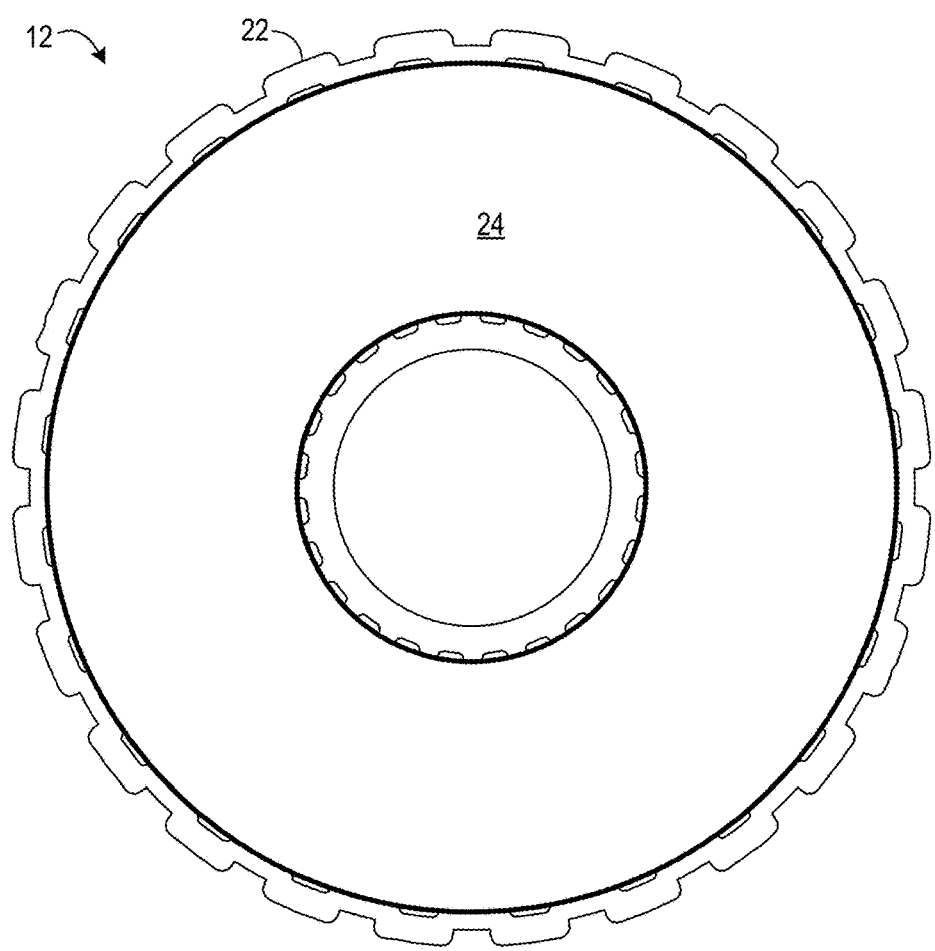
FIG. 2C shows a schematic, planar view of the flow restrictor of FIG. 2B.

FIG. 2B shows a schematic, perspective view of the flow restrictor 12 of the exemplary embodiment of FIG. 1 comprising a first sheet 22 including a flow passage 26a and a second sheet 24 stacked on the first sheet 22. The term sheet is used herein to refer to a structure with a thickness that is substantially less than its lateral dimensions (e.g., horizontal and vertical dimensions in the view of FIG. 2C). Although circular sheets 21 are shown, the perimeters of the sheets 21 may be of other shapes, such as polygons. Although sheets 21 of uniform thickness are shown, the sheets 21 may alternatively be of non-uniform thickness. The sheets 21 may alternatively be referred to as plates. FIG. 2C shows a schematic, planar view of the flow restrictor 12. The first sheet 22 and the second sheet 24 can be fabricated as circular disks with an opening in the middle. The first sheet 22 and the second sheet 24 can be made of metals including but not limited to stainless steel or superalloys comprising oxidation-corrosion-resistant materials. To stack the second sheet 24 on the first sheet 22, the first sheet 22 and the second sheet 24 can be fused via diffusion bonding, for example. Other adhesion techniques may alternatively be used. Or, in some cases, additive manufacturing may be used to form the flow paths described herein in a monolithic block of material.

Figure 2D:
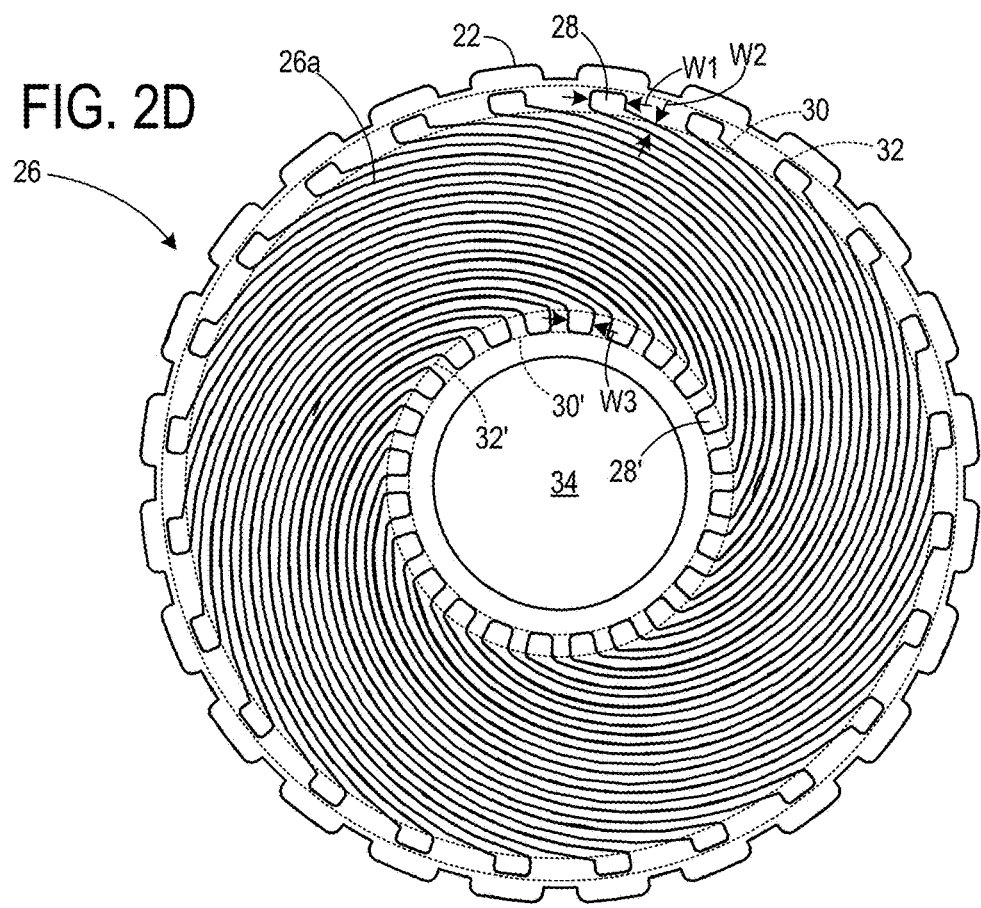
FIG. 2D shows a schematic, planar view of a first sheet of the flow restrictor of FIGS. 2B-C.

FIG. 2D shows a schematic, planar view of the first sheet 22 in isolation. A circular hole 34 is provided in a center of the first sheet 22. The flow passage 26a includes a groove cut into a surface of the first sheet 22 that communicates with an outer expansion zone 28 at a peripheral area of the first sheet 22. In this example the flow passage 26a is one of a plurality of flow passages 26 that are uniformly radially distributed around the hole 34. Each flow passage 26a can include a corresponding groove that spirals from the hole 34 to a corresponding outer expansion zone 28 at the peripheral area of the first sheet 22. Spiral shaped grooves have the technical advantage of lengthening the flow path within the restrictor, which can be advantageous. However, although spiral shaped grooves are illustrated, it will be appreciated that the grooves may have another shape, such as linear or curved in a non-spiral shape. The outer expansion zone 28 typically has a cross-sectional area perpendicular to a flow direction that is larger than the cross-sectional area perpendicular to the flow direction within the flow passage 26a. As viewed from above in FIG. 2D, a width W1 of the outer expansion zone 28 is larger than a width W2 of flow passage 26a. Typically, the width W1 of the outer expansion zone 28 can be 20%, 50%, 100% or even 500% larger than the width W2 of the flow passage 26a.

The spiral shape of the groove in the illustrated embodiment terminates at an inner diameter 30 of the outer expansion zone 28. Inside the outer expansion zone 28, the shape of flow passages 26 inside the outer expansion zone 28 can be linear as shown, or can continue in a curved shape. The groove can be manufactured by chemical etching, laser micro-machining, or a combination of both. Alternatively, the groove can be manufactured by other techniques in which the material of the first sheet 22 is not cut entirely through the sheet (i.e., is cut to form a bottomed groove).

It will be appreciated that an outer peripheral edge 27 of the second sheet 24 (see FIG. 2E) contacts the first sheet 22 in the outer expansion zone 28 between an inner diameter 30 and an outer diameter 32 of the expansion zone 28. Here, the outer expansion zone 28 is received by one end of the flow passage 26a. A thickness of the first sheet 22 can be 10 to 100 μm. A length of the flow passage 26a can be 100 to 1000 times the thickness of the first sheet 22. A width of the flow passage 26a can be about 5 to 100 times the thickness of the first sheet 22.

By providing an outer expansion zone 28 in the outer peripheral area of the first sheet 22, the uncertainty in flow restriction performance can be reduced compared to a conventional restrictor including the conventional disk 422 of FIG. 2A.

An inner expansion zone 28' can also be provided in an inner peripheral area of the first sheet 22, as illustrated in FIG. 2D. The inner expansion zone 28' can be provided to the first sheet 22 additionally or alternatively to the outer expansion zone 28. The flow passage 26a including the groove cut into the surface of the first sheet 22 can also communicate with an inner expansion zone 28' at an inner peripheral area of the first sheet 22. The corresponding groove of each flow passage 26a spirals from the outer expansion zone 28 in the outer peripheral area of the first sheet 22, into the inner expansion zone 28' adjacent the hole 34. An inner peripheral edge 27' of the second sheet 24 (see FIG. 2E) contacts the first sheet 22 in the inner expansion zone 28' between an inner diameter 30' and an outer diameter 32' of the inner expansion zone 28'. By providing inner expansion zone 28' in the inner peripheral area of the first sheet 22, the uncertainty in flow restriction performance can be reduced compared to a conventional restrictor including the conventional disk 422 of FIG. 2A. Like the outer expansion zone 28, the inner expansion zone 28' typically has a cross-sectional area perpendicular to a flow direction that is larger than the cross-sectional area perpendicular to the flow direction within the flow passage 26a. As viewed from above in FIG. 2D, a width W3 of the inner expansion zone 28' is larger than a width W2 of flow passage 26a.

Typically, the width W3 of the inner expansion zone 28' can be 20%, 50%, 100% or even 500% larger than the width W2 of the flow passage 26a.

Figure 2E:
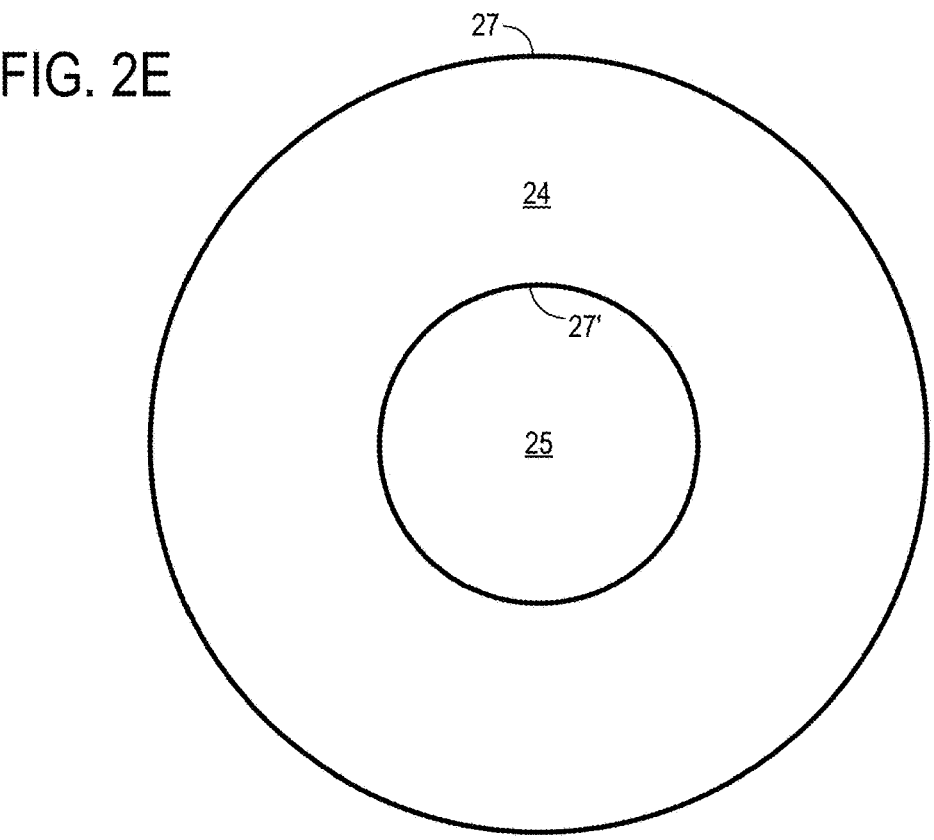
FIG. 2E shows a schematic, planar view of a second sheet of the flow restrictor of FIGS. 2B-C.

FIG. 2E shows a schematic, planar view of the second sheet 24 in isolation. A hole 25 is provided in a center of the second sheet 24. In this example, the second sheet 24 has no flow passages.

Figure 2F:
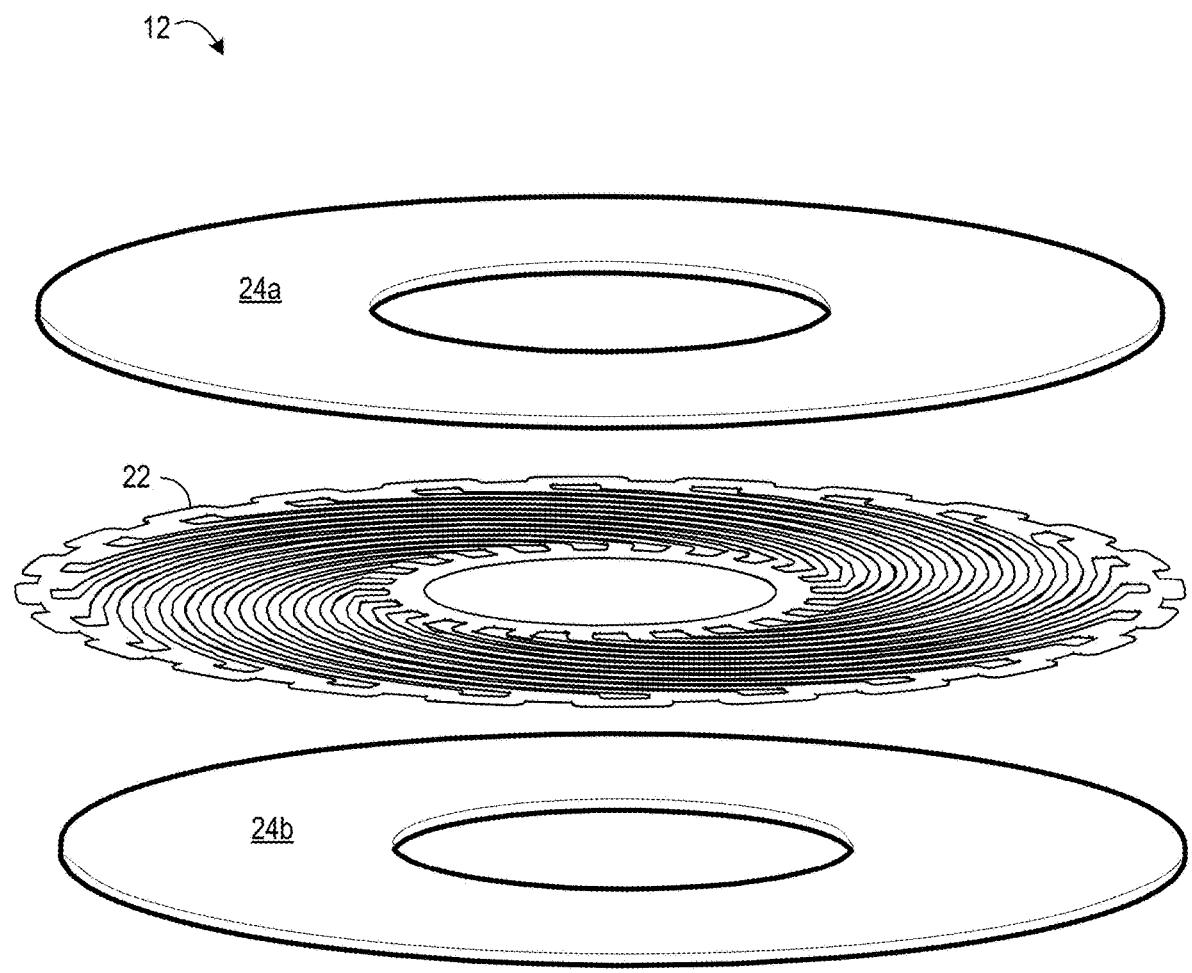
FIG. 2F shows a schematic, exploded view of the flow restrictor of FIGS. 2B-C.

FIG. 2F shows a schematic, exploded view of the flow restrictor 12 formed by the first sheet 22, a top second sheet 24a, and a bottom second sheet 24b.

Figure 2G:
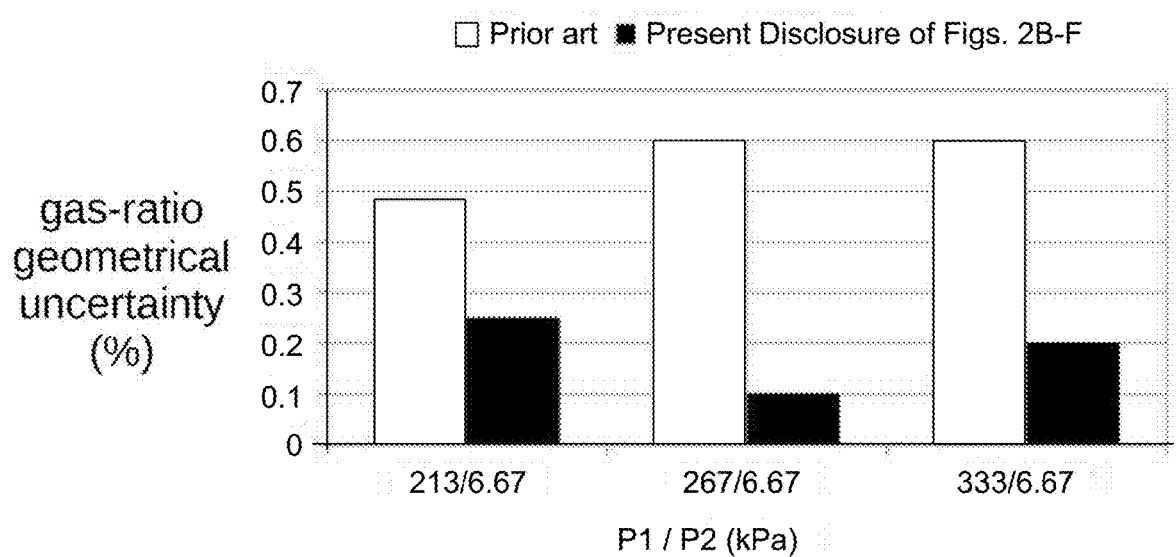
FIG. 2G shows a bar chart comparing the uncertainty in the performance of the flow restrictor of FIGS. 2B-F to conventional flow restrictors.

FIG. 2G is a prophetic bar chart based on simulation data comparing the uncertainty in the performance of flow restrictor 12 of the exemplary embodiment of FIGS. 2B-2F to conventional flow restrictors for some combinations of upstream pressure (P1) and downstream pressure (P2), with pressure measured in kPa. The results in FIG. 2G were obtained with computational-fluid-dynamics (CFD) simulations using a CFD model that agrees with experimental data within experimental uncertainty. The uncertainty depicted in FIG. 2G is the sensitivity of the molar flow rate ratio of sulfur hexafluoride and nitrogen to a worst-case-scenario restrictor-geometry variation. As can be seen in FIG. 2G, the configuration of the outer expansion zone 28 at the peripheral area of the first sheet 22 of the flow restrictor 12 reduces uncertainty compared to flow restrictors of the prior art, including conventional disk 422. It is thought that this technical effect is achieved by mitigating the geometrical uncertainty and the end of the flow passages.

Figure 2H:
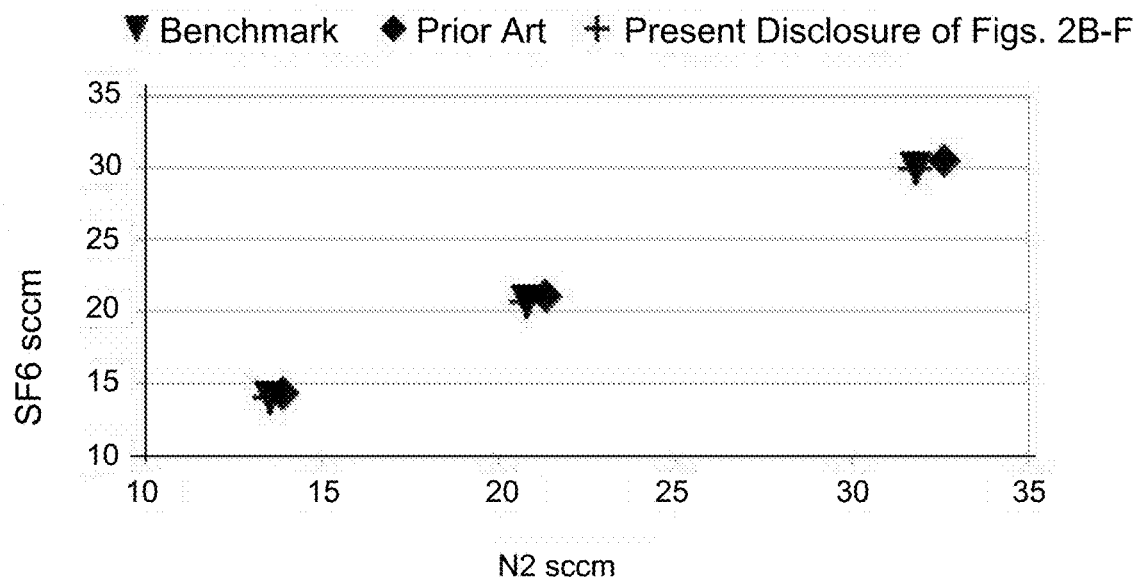
FIG. 2H shows a chart illustrating the reduction of uncertainty in flow restrictor performance shown in FIG. 2G.

FIG. 2H is a prophetic chart based on simulation data illustrating the reduction of uncertainty in flow restrictor performance shown in FIG. 2G. FIG. 2H plots the molar flow rate per flow path of sulfur hexafluoride versus that of nitrogen for three cases. Ideally, restrictors could be manufactured with infinitesimal precision, as illustrated for the benchmark case in FIG. 2H. But in practice, there is a manufacturing tolerance which is taken into account. It will be noted in FIG. 2H that the sccm (standard cubic centimeter per minute) deviation from the ideal is smaller with the configuration of the outer expansion zone 28 at the peripheral area of the first sheet 22 of the flow restrictor 12, compared to flow restrictors with a conventional disk 422. This achieves the potential advantage of reducing the uncertainty in flow restrictor performance as illustrated in FIG. 2G.

Figure 3A:
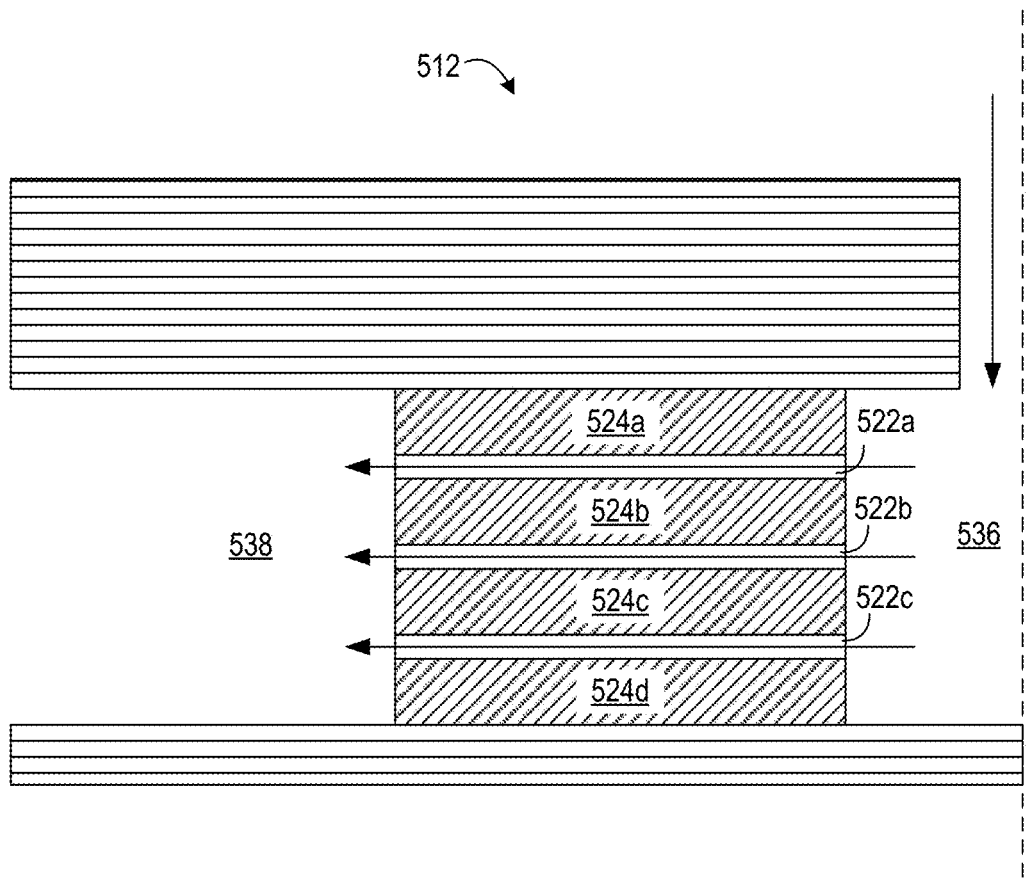
FIG. 3A shows a schematic, cross-sectional side view of a conventional flow restrictor.

FIG. 3A shows a cross-sectional side view of a conventional flow restrictor 512. The direction of the fluid flow is indicated with arrows flowing from a flow inlet 536, through the flow restrictor 512, and into the flow outlet 538. First sheets 522a, 522b, 522c and second sheets 524a, 524b, 524c, 524d are stacked in an alternating manner. In the conventional flow restrictor 512, the fluid flows radially outwards between the second sheets 524a, 524b and through the flow paths of the first sheets 522a, 522b. However, in other conventional flow restrictors, the fluid flow can alternatively flow radially inwards between the second sheets 524a, 524b and through the flow paths of the first sheets 522a, 522b. In this example, the fluid does not flow through the second sheets 524a-d.

Figure 3B:
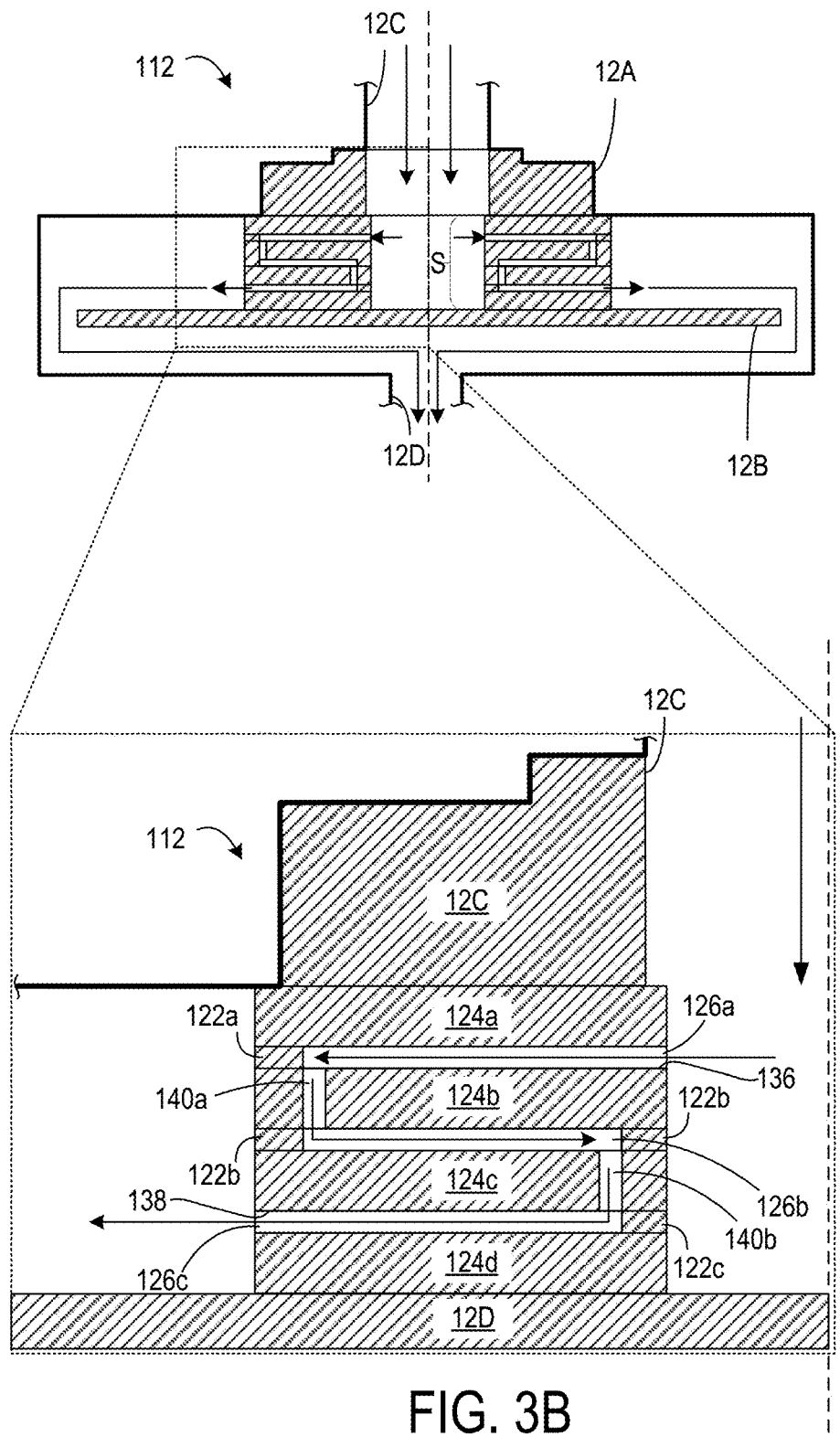
FIG. 3B shows a schematic, cross-sectional side view of a flow restrictor according to one example of the gas delivery system of FIG. 1.

FIG. 3B illustrates a cross-sectional side view of a flow restrictor 112 in an exemplary embodiment of the present disclosure. The direction of the fluid flow is indicated with arrows flowing through the flow restrictor 112 from a restrictor flow inlet 12C, through a sheet flow inlet 136, out of a sheet flow outlet 138, and eventually being guided to flow out of a restrictor flow outlet 12D. First sheets 122a, 122b, 122c and second sheets 124a, 124b, 124c, 124d are stacked alternately to form a restrictor stack S. The first sheets 122a, 122b, 122c are provided with flow passages 126a, 126b, 126c, respectively. The flow restrictor 112 comprises an upstream flow passage 126a connected to an upstream end of the restrictor stack 112. A downstream flow passage 126c is connected to a downstream end of the restrictor stack.

In the flow restrictor 112 of this example, two of the second sheets 124b, 124c include slits 140a, 140b penetrating through an entire thickness of the second sheets 124b, 124c, respectively. The slit 140a fluidically communicates the flow passage 126a of first sheet 122a with the flow passage 126b of first sheet 122b. The slit 140b fluidically communicates the flow passage 126b of first sheet 122b with the flow passage 126c of first sheet 122c.

Accordingly, the first sheets 122a, 122b, 122c and second sheets 124a, 124b, 124c, 124d are stacked and aligned to form a continuous flow path from the sheet flow inlet 136, through the flow passages 126a, 126b, 126c and slits 140a, 140b of the flow restrictor 112, and into the sheet flow outlet 138, so that the continuous flow path forms a serpentine shape extending along a thickness direction of the second sheets 124a-c as viewed in a vertical cross section of the second sheets 124a-c. In this example, the fluid flow passes through the flow passage 126a, slit 140a, flow passage 126b, slit 140b, and flow passage 126c, in this order as the fluid flow from the sheet flow inlet 136, through the flow restrictor 112 stack S, to the sheet flow outlet 138. By increasing the effective length of the flow path inside the flow restrictor 112 and by passing the fluid flow through a plurality of first sheets 122a, 122b, 122c, the uncertainty in flow restriction performance can be reduced compared to the conventional flow restrictor 512.

Figure 4A:
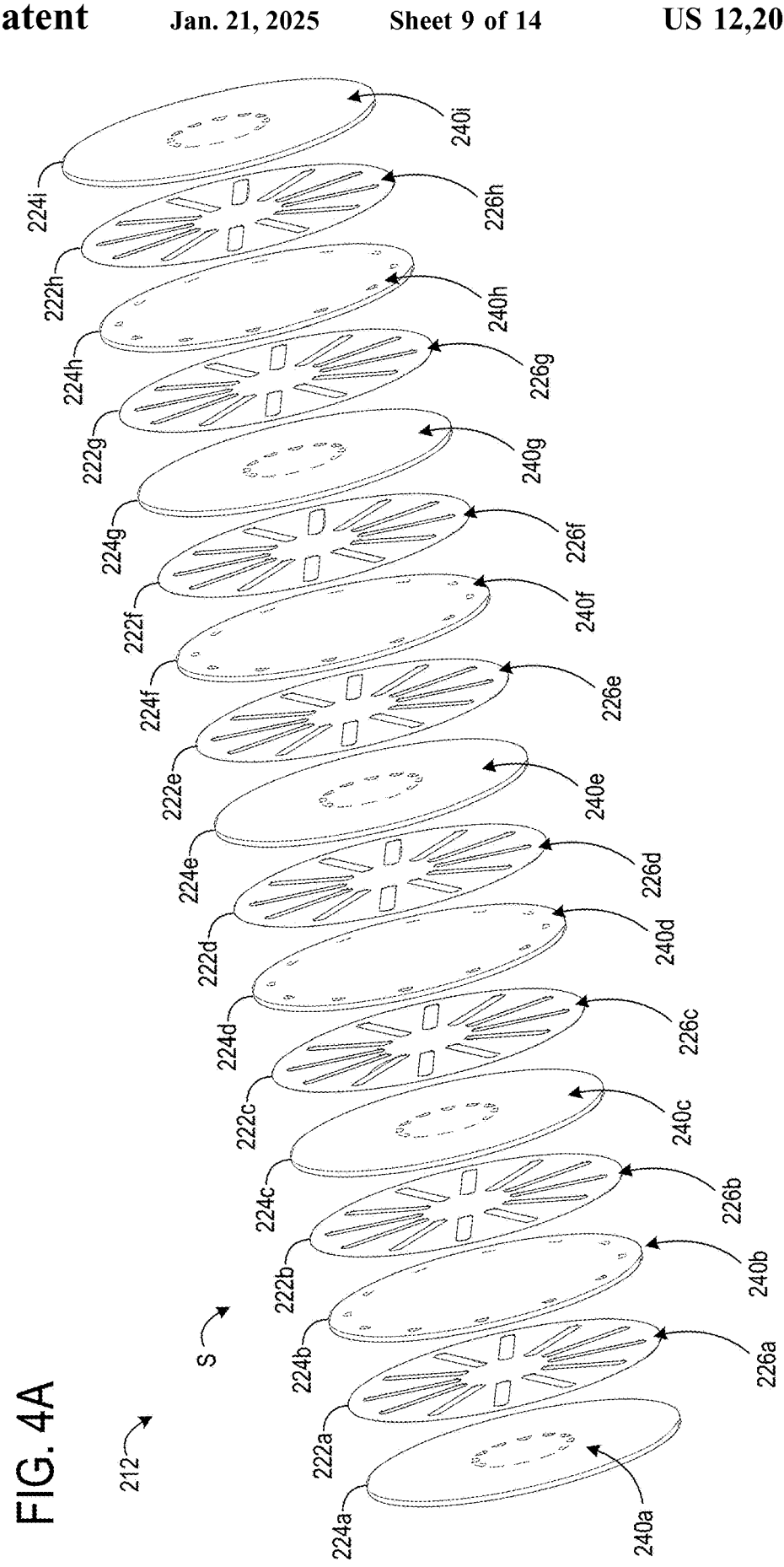
FIG. 4A shows a schematic, exploded view of a flow restrictor according to one example of the gas delivery system of FIG. 1.

FIG. 4A illustrates a schematic, exploded view of a stack S of a flow restrictor 212 in an exemplary embodiment of the present disclosure, in which eight first sheets 222a-h and nine second sheets 224a-i are stacked alternately to comprise a restrictor stack. Like the exemplary embodiment of FIG. 3B, the first sheets 222a-h are provided with flow passages 226a-h, respectively, and the second sheets 224a-i comprise slits 240a-i, respectively, which penetrate through an entire thickness of the second sheets 224a-i, respectively. It will be appreciated that the number of first sheets and second sheets stacked alternately is not particularly limited to the number depicted in FIG. 4A, and may be more or less than this number depending on the application of the mass flow controller incorporating the flow restrictor 212. A typical range for a number of sheets in stack S is between 3 and 99, and more typically is between 5 and 15.

In the exemplary embodiments of FIGS. 3B and 4A, a plurality of successively measured fluid flow rates through the restrictor divided by a number of the plurality of first sheets divided by a number of flow passages per first sheet can average a Mach number of less than 0.1. Here, the average Mach number is defined as mass flow rate divided by the product of the following: average density in the restrictor, the flow path cross-sectional area, the sound speed in the gas, and the total number of flow paths. Based on this definition, the Mach number can be reduced to less than 0.1 by increasing the average density in the restrictor, increasing the flow path cross-sectional area, and/or increasing the total number of flow paths, for a fixed mass flow rate. In the embodiments of FIGS. 3B and 4A, the total number of flow paths can be increased by increasing the number of first sheets and second sheets that are stacked alternately to comprise a restrictor stack, so that the average Mach number is less than 0.1.

In the exemplary embodiment of FIG. 3B with three first sheets 122a-c and one flow passage per first sheet, a plurality of successively measured fluid flow rates through the restrictor 112 divided by three divided by one can average a Mach number of less than 0.1. In the exemplary embodiment of FIG. 4A with eight first sheets 222a-h with twelve flow passages per first sheet, a plurality of successively measured fluid flow rates through the restrictor 212 divided by three divided by twelve can average a Mach number of less than 0.1.

Figure 4B:
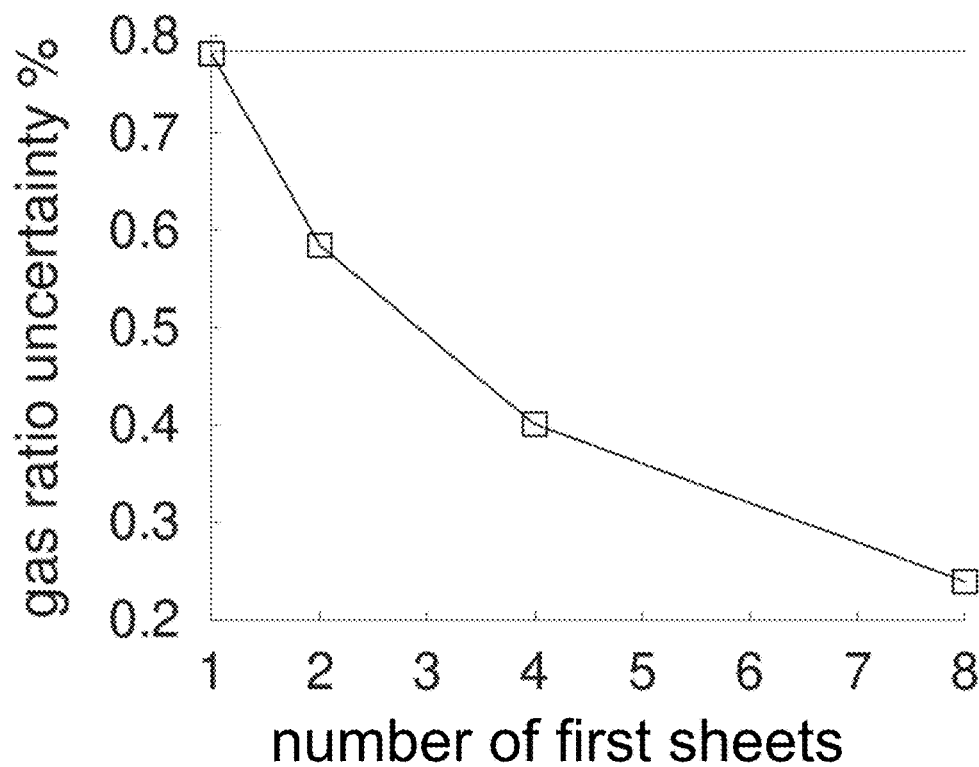
FIG. 4B shows a chart illustrating the reduction of uncertainty in the performance of the flow restrictor with an increasing number of first sheets.

FIG. 4B shows a prophetic chart based on simulation data illustrating the reduction of uncertainty in the performance of the flow restrictor with an increasing number of first sheets, which is due to an averaging process. As FIG. 4B indicates, the uncertainty in the performance of the flow restrictor is reduced as the number of first sheets increases because of an averaging process. FIG. 4B shows theoretical results using a simplified physics-based model that agrees well with CFD and experimental data. For this chart, the measured uncertainty is the sensitivity of the molar flow rate ratio of sulfur hexafluoride and nitrogen to random variations of the width of the first sheets. Many representative operating conditions were used to obtain the results in FIG. 4B.

Figure 4C:
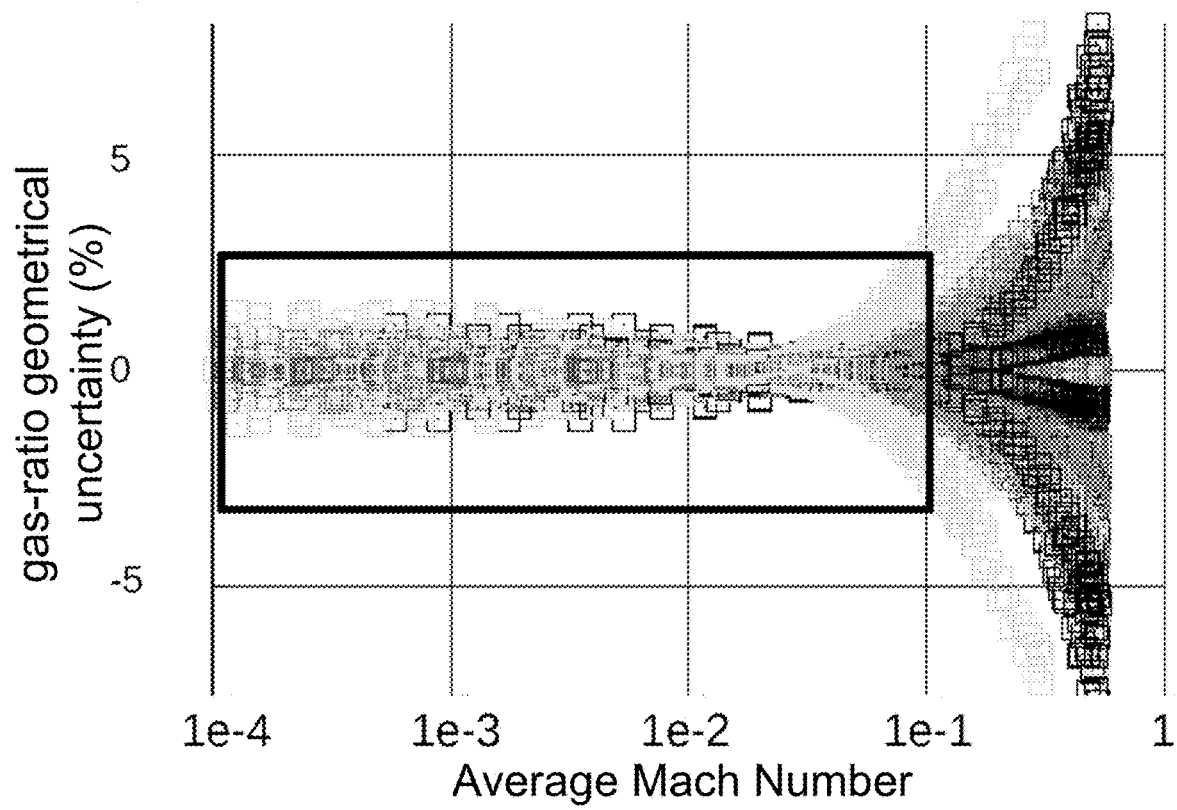
FIG. 4C shows a chart illustrating the uncertainty in the performance of the flow restrictor as a function of average Mach number for a vast number of flow path geometries and process gases.

FIG. 4C shows a prophetic chart based on simulation data illustrating the uncertainty in the performance of the flow restrictor as a function of average Mach number for a vast number of flow path geometries and process gases. Results were obtained with a simplified physics-based model that agrees well with CFD results and experimental data. The uncertainty is defined as in FIG. 2G, where it is depicted as the sensitivity of the molar flow rate ratio of sulfur hexafluoride and nitrogen to a worst-case-scenario restrictor-geometry variation. However, unlike FIG. 2G, the chart of FIG. 4C uses flow rate ratios using different gases besides sulfur hexafluoride. FIG. 4C indicates that the uncertainty can be reduced by keeping the average Mach number to less than about 0.1, as indicated by '1e-1' in the chart of FIG. 4C.

Figure 5A:
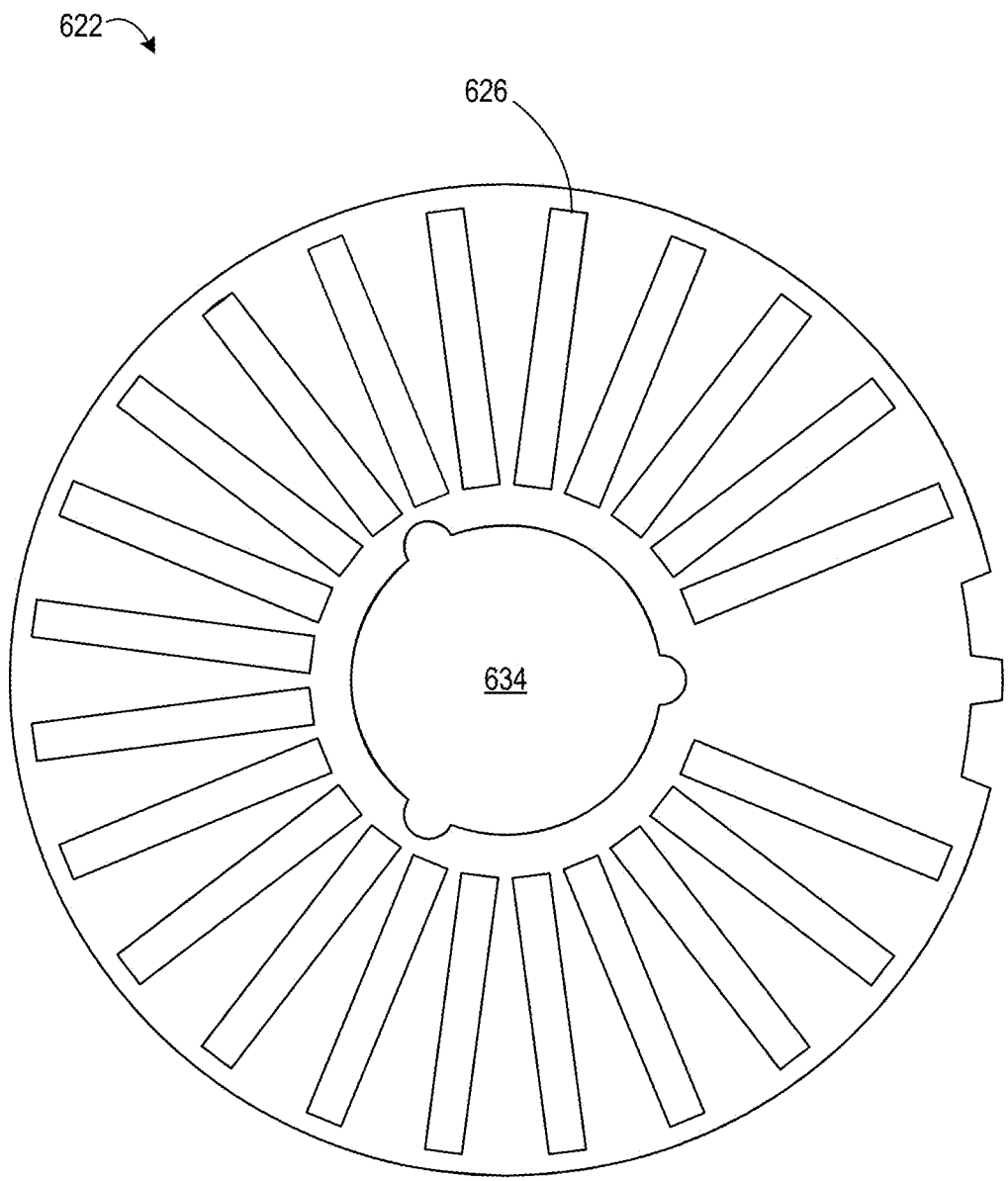
FIG. 5A shows a schematic, planar view of a conventional disk of a conventional flow restrictor.

FIG. 5A shows a schematic, planar view of a conventional disk 622 of a flow restrictor comprising a flow passage 626 that radiates from a hole 634 of the disk 622. It will be noted that the shape of the flow passage 626 is rectangular.

Figure 5B:
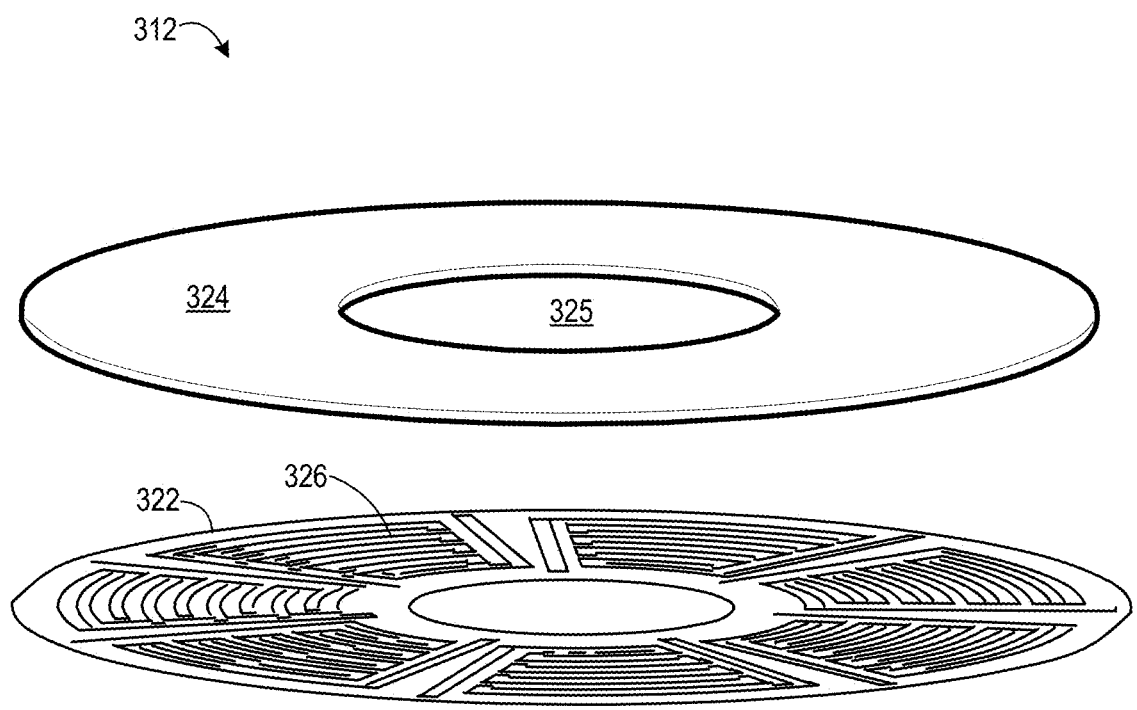
FIG. 5B shows a schematic, exploded view of a flow restrictor according to one example of the gas delivery system of FIG. 1.

FIG. 5B shows a schematic, exploded view of a flow restrictor 312 of an exemplary embodiment of the present disclosure. As illustrated in FIG. 5B, the flow restrictor 312 comprises a first sheet 322 comprising a flow passage 326; and a second sheet 324 stacked on the first sheet 322. A hole 325 is provided in a center of the second sheet 324. The flow passage 326 is a serpentine groove cut through a thickness of the first sheet 322 and forming a serpentine shape along a surface of the first sheet 322 as viewed from above.

Figure 5C:
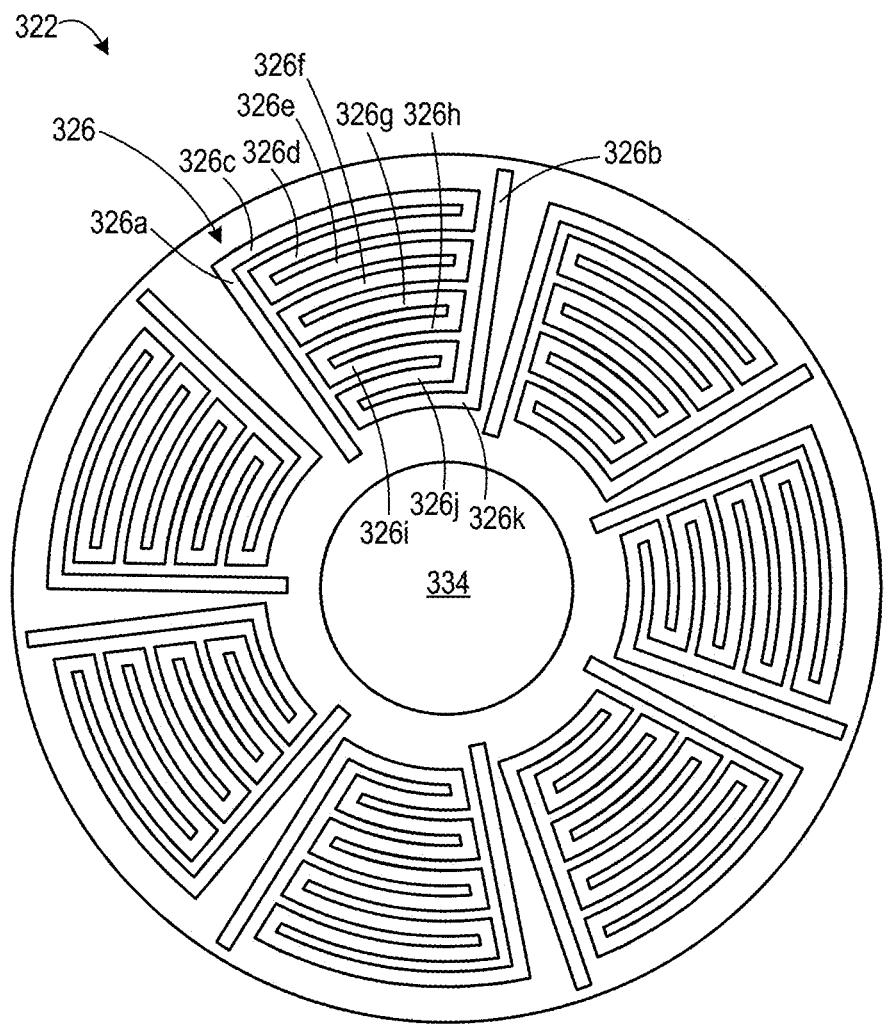
FIG. 5C shows a schematic, planar view of the first sheet of the flow restrictor of FIG. 5B.

FIG. 5C shows a schematic, planar view of the first sheet 322 in isolation. A hole 334 is provided in a center of the first sheet 322. The flow passage 326 includes a plurality of serpentine grooves cut into a surface or through the thickness of the first sheet 322. Each of the plurality of serpentine grooves of the flow passage 326 includes a pair of radial sections 326a, 326b extending in radial directions and a plurality of arcuate sections 326c-k defining a flow path between the plurality of radial sections 326a, 326b. By increasing the effective length of the flow path inside the flow restrictor 312, the uncertainty in the performance of the flow restrictor 312 can be reduced compared to a conventional flow restrictor with a conventional disk 622.

Figure 5D:
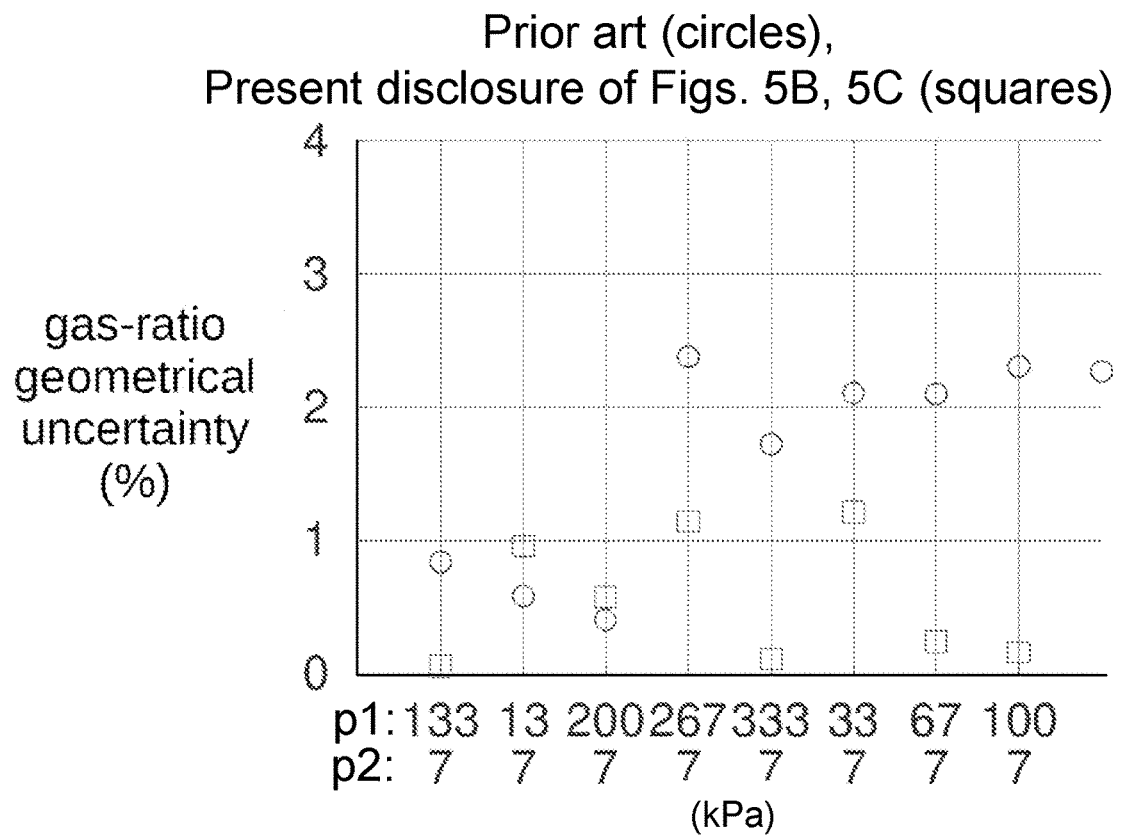
FIG. 5D shows a data plot comparing the uncertainty in the performance of the flow restrictor of FIGS. 5B-C to conventional flow restrictors with a conventional disk.

FIG. 5D is a prophetic data plot based on simulation data comparing the uncertainty in the performance of flow restrictor 312 of the exemplary embodiment of FIGS. 5B-C to conventional flow restrictors with a conventional disk 622 for some combinations of upstream pressure (P1) and downstream pressure (P2), with pressure measured in kPa. The experimental results in FIG. 5D were obtained with CFD simulations using a CFD model that agrees with experimental data within experimental uncertainty. The uncertainty depicted in FIG. 5D is the sensitivity of the molar flow rate ratio of sulfur hexafluoride and nitrogen to a worst-case-scenario restrictor-geometry variation. As can be seen in FIG. 5D, the configuration of a flow passage 326 including a plurality of serpentine grooves cut into a surface of the first sheet 322 reduces uncertainty compared to flow restrictors of the prior art, including conventional disk 622. The present inventors demonstrated through CFD simulations that the pressure drops at the corners of the serpentine grooves would be minimal and contribute little to uncertainty.

Figure 6:
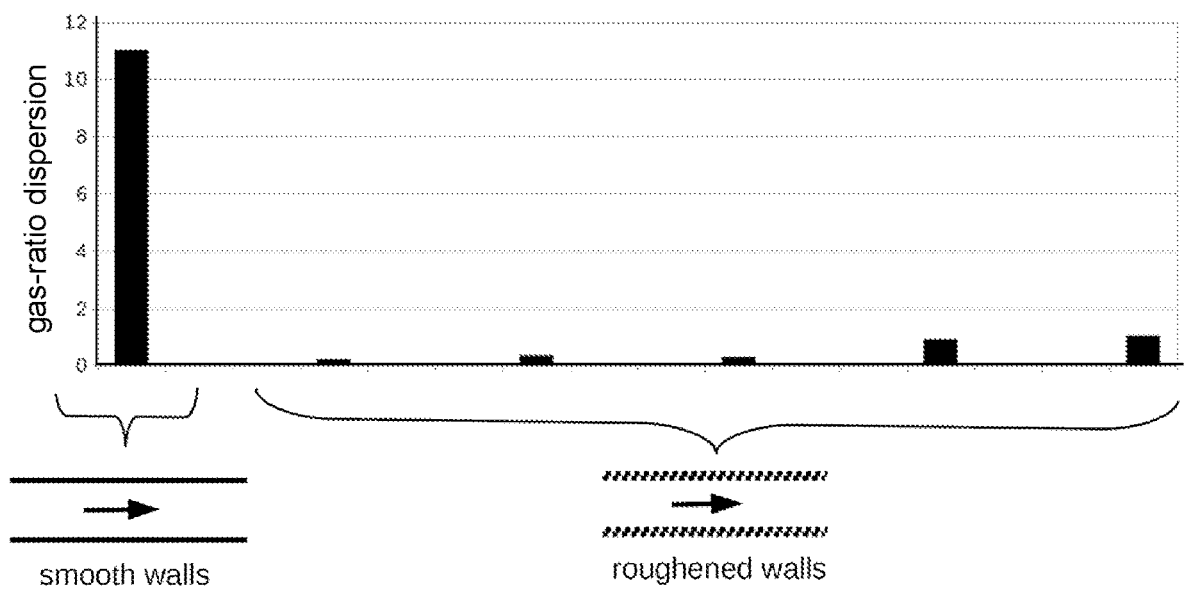
FIG. 6 shows a bar graph comparing a gas-ratio dispersion of a conventional flow restrictor with smooth first and second sheets to gas-ratio dispersions of flow restrictors of the present disclosure in which the second sheet has a rougher surface than the first sheet.

FIG. 6 is a prophetic bar graph based on simulation data comparing a gas-ratio dispersion of a conventional flow restrictor with smooth first and second sheets to gas-ratio dispersions of flow restrictors of exemplary embodiments in which the second sheet has a rougher surface than the first sheet. In the exemplary embodiments of FIG. 6, the ratios of the roughness parameter (Ra) and the flow path thickness were 1 to 5%. In other words, for the exemplary embodiments described above, the second sheet can have a roughened surface relative to a surface of the first sheet. In other words, a roughness parameter of the second sheet can be greater than a roughness parameter of the first sheet. The roughness parameter can be a profile roughness parameter or an area roughness parameter.

The gas-ratio dispersion of FIG. 6 is defined as the maximum variation of the flow rate ratio of helium and nitrogen at some conditions. The larger this dispersion is, the larger the uncertainty in the performance of the flow restrictor is. The results in FIG. 6 were obtained with CFD simulations using a CFD model that agrees with experimental data within experimental uncertainty.

In principle, it was conventionally thought that roughening the walls of the second sheets would increase the uncertainty in the performance of the flow restrictor, because parameters characterizing the roughness would add to the uncertainty. As a result, using second sheets with smooth walls has been the norm in flow restrictor design. For example, ratios of the roughness parameter (Ra) and the flow path thickness are typically less than about 1%.

However, the unexpected results in FIG. 6 indicate that the roughening of the second sheets results in a reduction of uncertainty that is out of proportion to the effect of merely changing the roughness parameters. Therefore, the unexpected results of FIG. 6 show that roughening the walls can significantly reduce flow restrictor uncertainty, at least for the operating parameters considered above. The roughening of the surfaces of the first and second sheets can be achieved in different ways. One is the mechanical abrasion of the metal sheets used to make the second sheets. Another one is to cycle temperature and pressure during the diffusion-bonding of first sheets and second sheets in a way to roughen the walls.

It will be understood that the configurations and/or approaches described herein are exemplary in nature, and that these specific embodiments or examples are not to be considered in a limiting sense, because numerous variations are possible.

For example, the features of the exemplary embodiment of FIGS. 2B-F can be combined with the features of the exemplary embodiment of FIG. 4A to incorporate expansion zones into a restrictor stack with a plurality of first and second sheets with an average Mach number of less than 0.1. The features of the exemplary embodiment of FIGS. 2B-F can be combined with the features of the exemplary embodiment of FIG. 3B to incorporate expansion zones into flow restrictors with serpentine flow paths extending along a thickness direction of the second sheets.

Alternatively, the features of the exemplary embodiment of FIGS. 5B-C can be combined with the features of the exemplary embodiment of FIG. 4A to incorporate serpentine grooves on the first sheets of restrictor stack with a plurality of first and second sheets with an average Mach number of less than 0.1. The features of the exemplary embodiment of FIGS. 5B-C can be combined with the features of the exemplary embodiment of FIG. 3B to incorporate serpentine grooves on the first sheets of flow restrictors with serpentine flow paths extending along a thickness direction of the second sheets. Further, the features of the exemplary embodiment of FIG. 3B can be combined with the features of the exemplary embodiment of FIG. 4A to incorporate serpentine flow paths extending along a thickness direction of the second sheets into a restrictor stack with a plurality of first and second sheets with an average Mach number of less than 0.1.

In accordance with the present disclosure, uncertainty in the performance of the flow restrictors of mass flow controllers is decreased, so that the quality of fluid delivery can be increased in various industrial applications.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein may define patentable subject matter apart from the disclosed examples and may find utility in other implementations not expressly disclosed herein.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

To the extent that terms "includes," "including," "has," "contains," and variants thereof are used herein, such terms are intended to be inclusive in a manner similar to the term "comprises" as an open transition word without precluding any additional or other elements.

The invention claimed is:

1. A flow restrictor, comprising:
a first sheet including a flow passage and an expansion zone, the expansion zone being an opening formed through the first sheet in a peripheral area thereof; and
a second sheet stacked on the first sheet, wherein
a hole is provided in the second sheet,
the flow passage includes a groove in a surface of the first sheet that communicates with the expansion zone, and
a peripheral edge of the second sheet contacts the first sheet in the expansion zone.

2. The flow restrictor of claim 1, wherein the flow passage is one of a plurality of flow passages that are distributed around the hole.

3. The flow restrictor of claim 2, wherein each flow passage includes a corresponding groove that spirals from the hole to a corresponding expansion zone at the peripheral area of the first sheet.

4. The flow restrictor of claim 1, wherein
the first sheet is one of a plurality of first sheets,
the second sheet is one of a plurality of second sheets, and
the plurality of first sheets and the plurality of second sheets are stacked alternately to form a restrictor stack.

5. The flow restrictor of claim 4, further comprising:
an upstream flow passage connected to an upstream end of the restrictor stack; and
a downstream flow passage connected to a downstream end of the restrictor stack,
wherein a plurality of successively measured fluid flow rates through the flow restrictor divided by a number of the plurality of first sheets divided by a number of flow passages per first sheet average to a Mach number of less than 0.1.

6. The flow restrictor of claim 1, wherein
the second sheet includes a slit penetrating through an entire thickness of the second sheet, and
the first sheet and the second sheet are stacked and aligned to form a continuous flow path through the slit of the second sheet and the flow passage of the first sheet.

7. The flow restrictor of claim 6, wherein the continuous flow path forms a serpentine shape extending along a thickness direction of the second sheet as viewed in a vertical cross section of the second sheet.

8. The flow restrictor of claim 1, wherein the second sheet has a roughened surface relative to a surface of the first sheet.

9. A flow restrictor comprising:
a first sheet comprising a flow passage; and
a second sheet stacked on the first sheet, wherein
a hole is provided in the second sheet, and
the flow passage is a serpentine groove in a thickness of the first sheet and forming a serpentine shape in which the flow passage turns back and forth a plurality of times along a surface of the first sheet as viewed from a viewpoint aligned with a central axis of the first sheet, viewing the first sheet in an axial direction directly above a center of the first sheet.

10. The flow restrictor of claim 9, wherein the flow passage comprises a plurality of serpentine grooves in the thickness of the first sheet.

11. The flow restrictor of claim 10, wherein each of the plurality of serpentine grooves includes a pair of radial sections extending in radial directions and a plurality of arcuate sections defining a flow path between a plurality of radial sections.

12. The flow restrictor of claim 9, wherein
the first sheet is one of a plurality of first sheets, and
the second sheet is one of a plurality of second sheets, and
the plurality of first sheets and the plurality of second sheets are stacked alternately to form a restrictor stack.

13. The flow restrictor of claim 12, further comprising:
an upstream flow passage connected to an upstream end of the restrictor stack; and
a downstream flow passage connected to a downstream end of the restrictor stack,
wherein a plurality of successively measured fluid flow rates through the flow restrictor divided by a number of the plurality of first sheets divided by a number of flow passages per first sheet average a Mach number of less than 0.1.

14. The flow restrictor of claim 9, wherein
the second sheet includes a slit penetrating through an entire thickness of the second sheet, and
the first sheet and the second sheet are stacked and aligned to form a continuous flow path through the slit of the second sheet and the flow passage of the first sheet.

15. The flow restrictor of claim 14, wherein the continuous path forms a serpentine shape extending along a thickness direction of the second sheet as viewed in a vertical cross section of the second sheet.

16. The flow restrictor of claim 9, wherein the second sheet has a roughened surface relative to a surface of the first sheet.

17. A flow restrictor comprising:
a plurality of first sheets each comprising a flow passage which is a groove formed in a surface thereof; and
a plurality of second sheets each stacked on one of the first sheets, wherein
each of the second sheets includes a slit penetrating through an entire thickness of the second sheet,
the plurality of first sheets and the plurality of second sheets are alternately stacked and aligned to form a continuous flow path through the slit of each of the second sheets and the flow passage of each of the first sheets, and
the continuous flow path forms a serpentine shape.

18. The flow restrictor of claim 17, wherein the continuous flow path forms the serpentine shape extending along a thickness direction of the second sheet as viewed in a vertical cross section of the second sheet.

19. The flow restrictor of claim 17, wherein
the plurality of first sheets and the plurality of second sheets are stacked alternately to form a restrictor stack.

20. The flow restrictor of claim 19, further comprising:
an upstream flow passage connected to an upstream end of the restrictor stack; and
a downstream flow passage connected to a downstream end of the restrictor stack,
wherein a plurality of successively measured fluid flow rates through the flow restrictor divided by a number of the plurality of first sheets divided by a number of flow passages per first sheet average a Mach number of less than 0.1.

* * * * *